(12) United States Patent
Ang et al.

(10) Patent No.: US 8,210,293 B2
(45) Date of Patent: Jul. 3, 2012

(54) HYBRID VEHICLE, METHOD OF CONTROLLING HYBRID VEHICLE, PROGRAM FOR CAUSING COMPUTER TO EXECUTE THE METHOD OF CONTROLLING HYBRID VEHICLE, AND COMPUTER READABLE STORAGE MEDIUM HAVING THE PROGRAM STORED THEREIN

(75) Inventors: Wanleng Ang, Toyota (JP); Toshiaki Niwa, Okazaki (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 570 days.

(21) Appl. No.: 12/311,321

(22) PCT Filed: Sep. 25, 2007

(86) PCT No.: PCT/JP2007/069157
§ 371 (c)(1),
(2), (4) Date: Mar. 26, 2009

(87) PCT Pub. No.: WO2008/044516
PCT Pub. Date: Apr. 17, 2008

(65) Prior Publication Data
US 2010/0006359 A1 Jan. 14, 2010

(30) Foreign Application Priority Data
Oct. 11, 2006 (JP) ................. 2006-277602

(51) Int. Cl.
*B60W 20/00* (2006.01)
*B60W 10/24* (2006.01)
*B60K 6/20* (2007.10)
(52) U.S. Cl. ............. 180/65.275; 180/65.21; 180/65.29

(58) Field of Classification Search ............... 180/65.21, 180/65.22, 65.27, 65.24, 65.275, 65.29
See application file for complete search history.

(56) References Cited

U.S. PATENT DOCUMENTS
5,539,399 A 7/1996 Takahira et al.
(Continued)

FOREIGN PATENT DOCUMENTS
DE 43 44 369 A1 7/1995
(Continued)

OTHER PUBLICATIONS

Extended Search Report issued in corresponding European Patent Application No. 07828897.4 dated Apr. 29, 2011.

*Primary Examiner* — John R Olszewski
(74) *Attorney, Agent, or Firm* — Oliff & Berridge, PLC (57) ABSTRACT

The present invention contemplates a hybrid vehicle capable of changing an amount to be charged to an electric power storage device in accordance with whether it is externally charged. The hybrid vehicle includes a control device inquiring of an occupant of the vehicle whether the occupant has an intention to go to a charging location for example at home. If so, the control device sets a target value for the electric power storage device's amount of a state (SOC) to have a value smaller than when the occupant does not have an intention to go to the charging location. This allows as much energy as possible to be received at the charging location and a vehicle can thus be obtained that less depends on an internal combustion engine and contributes to environmental protection.

13 Claims, 9 Drawing Sheets

U.S. PATENT DOCUMENTS

| | | | |
|---|---|---|---|
| 5,627,752 A | 5/1997 | Buck et al. | |
| 5,815,824 A | 9/1998 | Saga et al. | |
| 5,892,346 A * | 4/1999 | Moroto et al. | 318/587 |
| 6,166,449 A | 12/2000 | Takaoka et al. | |
| 6,166,499 A | 12/2000 | Kanamori et al. | |
| 7,013,205 B1 * | 3/2006 | Hafner et al. | 701/22 |
| 2001/0024104 A1 | 9/2001 | Suzuki | |
| 2003/0015358 A1 | 1/2003 | Abe et al. | |
| 2003/0015874 A1 | 1/2003 | Abe et al. | |
| 2006/0278449 A1 * | 12/2006 | Torre-Bueno | 180/65.2 |

FOREIGN PATENT DOCUMENTS

| | | |
|---|---|---|
| JP | A-06-258088 | 9/1994 |
| JP | A-09-168206 | 6/1997 |
| JP | A-10-150701 | 6/1998 |
| JP | A-2000-032606 | 1/2000 |
| JP | A-2000-217206 | 8/2000 |
| JP | A-2001-268719 | 9/2001 |
| JP | A-2002-051405 | 2/2002 |
| JP | A-2002-139332 | 5/2002 |
| JP | A-2003-032803 | 1/2003 |
| JP | A-2003-294463 | 10/2003 |
| JP | A-2004-007969 | 1/2004 |
| JP | A-2004-022384 | 1/2004 |
| JP | A-2004-245190 | 9/2004 |
| JP | A-2005-137135 | 5/2005 |

* cited by examiner

HYBRID VEHICLE, METHOD OF CONTROLLING HYBRID VEHICLE, PROGRAM FOR CAUSING COMPUTER TO EXECUTE THE METHOD OF CONTROLLING HYBRID VEHICLE, AND COMPUTER READABLE STORAGE MEDIUM HAVING THE PROGRAM STORED THEREIN

TECHNICAL FIELD

The present invention relates to hybrid vehicles, methods of controlling hybrid vehicles, programs for causing computers to execute the methods of controlling hybrid vehicles, and computer readable storage media having the programs stored therein.

BACKGROUND ART

In recent years, hybrid vehicles are increasingly gaining attention as ecologically friendly vehicles. Hybrid vehicles have in addition to a conventional internal combustion engine as a further motive power source a battery or a similar electric power storage device and an electric motor receiving electric power from the electric power storage device to use it to generate force driving the vehicle.

Japanese Patent Laying-Open No. 2005-137135 discloses a control device for a hybrid vehicle employing one or both of an engine and a motor as a braking and driving motive power source and communicating electric power between the motor and a battery.

The control device includes: a vehicular speed detection means detecting vehicular speed; braking and driving motive power control value setting means setting a braking and driving motive power control value for a vehicle; SOC detection means detecting a battery's state of charge (SOC); and a navigation device setting a traveling route for the vehicle and detecting the traveling route's road environment information.

The control device further includes: first efficiency index calculation means calculating an efficiency index value based on the traveling route's road environment information and the SOC and representing fuel utilization efficiency; second efficiency index calculation means calculating an efficiency index value based on the SOC to have larger values for larger SOCs; final efficiency index calculation means that selects the first efficiency index value obtained by the first efficiency index calculation means if the road environment information of the traveling route of the vehicle can be detected, otherwise selects the second efficiency index value obtained by the second efficiency index calculation means, and that in switching the efficiency index value performs a process to continuously change the efficiency index value from a value that the efficiency index value has before the efficiency index value is switched to match the efficiency index value to a value that should be attained after the efficiency index value is switched to obtain a final efficiency index value; and operation point determination means determining a point of operation of the engine and motor, as based on the detected vehicular speed value, the braking and driving motive power control value and the final efficiency index value, to allow the battery to be charged with smaller amounts for larger final efficiency index values.

The control device has one feature in that once a vehicle has reached a geographical point having within a predetermined distance a distance Xr to an end of a traveling route set by navigation, the final efficiency index calculation means calculates an efficiency index value to be farther away from the first efficiency index value and closer to the second efficiency index value as distance Xr decreases to be smaller.

A known hybrid vehicle has an externally charging function allowing a power supply external to the vehicle to be used to charge an electric power storage device. The hybrid vehicle having the externally charging function can be less dependent on an internal combustion engine. This can eliminate the necessity of the vehicle frequently going to a gas station to be refueled, and can also contribute to further environmental protection.

The technique disclosed in Japanese Patent Laying-Open No. 2005-137135 may be applied to a hybrid vehicle having the externally charging function. In other words, the vehicle is charged at an end of a traveling route. This would allow charging the vehicle to be started in a condition allowing large electric power to be charged.

However, the vehicle that has arrived home may immediately thereafter again leave home. In that case, if the vehicle is charged for example at home, the vehicle will not be externally charged, or will be charged for a short period of time and thus insufficiently charged, and leave.

DISCLOSURE OF THE INVENTION

The present invention contemplates a hybrid vehicle that can increase an amount to be charged that is acceptable in accordance with an intention to externally charge it, a method of controlling the hybrid vehicle, a program for causing a computer to execute the method of controlling the hybrid vehicle, and a computer readable storage medium having the program stored therein.

The present invention in summary provides a hybrid vehicle comprising: an internal combustion engine; an electric motor used to drive a wheel; a chargeable and dischargeable electric power storage device supplying the electric motor with electric power; an electric power generation device receiving mechanical motive power from the internal combustion engine to generate electric power; an electric power input unit receiving electric power provided from external to the vehicle to charge the electric power storage device; and a control device controlling an amount charged from the electric power generation device to the electric power storage device to allow the electric power storage device to have an amount of a state, representing a state of charge, approaching a target control value. The control device inquires of an occupant of the vehicle whether the occupant has an intention to go to a charging location, and the control device changes the target control value in accordance with an instruction of the occupant.

Preferably, the charging location is previously set, and the control device has a special SOC control mode available when the vehicle's current position has a distance of at most a predetermined value to the charging location, and the control device inquires of the occupant whether to select the special SOC control mode when a decision is made in a navigation system that the distance to the charging location is at most the predetermined value.

Preferably, if the occupant provides an instruction indicating that the occupant has an intention to go to the charging location, the control device sets the target control value to be lower than when the occupant does not have an intention to go to the charging location.

Preferably, the control device further inquires of the occupant an amount to be charged, and changes the target control value in accordance with the amount to be charged.

The present invention in another aspect provides a method of controlling a hybrid vehicle including an internal combustion engine, an electric motor used to drive a wheel, a chargeable and dischargeable electric power storage device supplying the electric motor with electric power, an electric power generation device receiving mechanical motive power from the internal combustion engine to generate electric power, and an electric power input unit receiving electric power provided from external to the vehicle to charge the electric power storage device. The method comprises the steps of inquiring of an occupant of the vehicle whether the occupant has an intention to go to a charging location; controlling first charging, controlling an amount charged from the electric power generation device to the electric power storage device to allow the electric power storage device to have an amount of a state, representing a state of charge, approaching a first target control value; controlling second charging, controlling an amount charged from the electric power generation device to the electric power storage device to allow the amount of the state to approach a second target control value lower than the first target control value; and determining in accordance with an instruction of the occupant to perform one of the step of controlling the first charging and the step of controlling the second charging.

Preferably, the charging location is previously set, and the method further comprises the steps of: obtaining a distance extending from the vehicle's current position to the charging location; and determining whether the distance is at most a predetermined value. The step of inquiring includes inquiring whether the occupant has an intention to go to the charging location when the distance is at most the predetermined value.

Preferably, the step of determining to perform one of the step of controlling the first charging and the step of controlling the second charging causes the step of controlling the second charging to be performed if the occupant's instruction indicates that the occupant has an intention to go to the charging location, and the step of determining causes the step of controlling the first charging to be performed if the occupant's instruction indicates that the occupant does not have an intention to go to the charging location.

Preferably, the method further comprises the steps of: further inquiring of the occupant an amount to be charged; and changing the second target control value in accordance with the amount to be charged.

The present invention in still another aspect provides a computer readable storage medium having a program stored therein for causing a computer to perform the method of controlling a hybrid vehicle, as described above.

The present invention in still another aspect provides a program for causing a computer to perform the method of controlling a hybrid vehicle, as described above.

In accordance with the present invention, as much energy as possible can be received at a charging location. A vehicle can thus be obtained that less depends on an internal combustion engine and emits less exhaust gas and thus contributes to environmental protection.

BEST MODES FOR CARRYING OUT THE INVENTION

Hereinafter reference will be made to the drawings to describe the present invention in an embodiment. In the figures, identical or like components are identically denoted and accordingly will not be described repeatedly.

Figure 1:
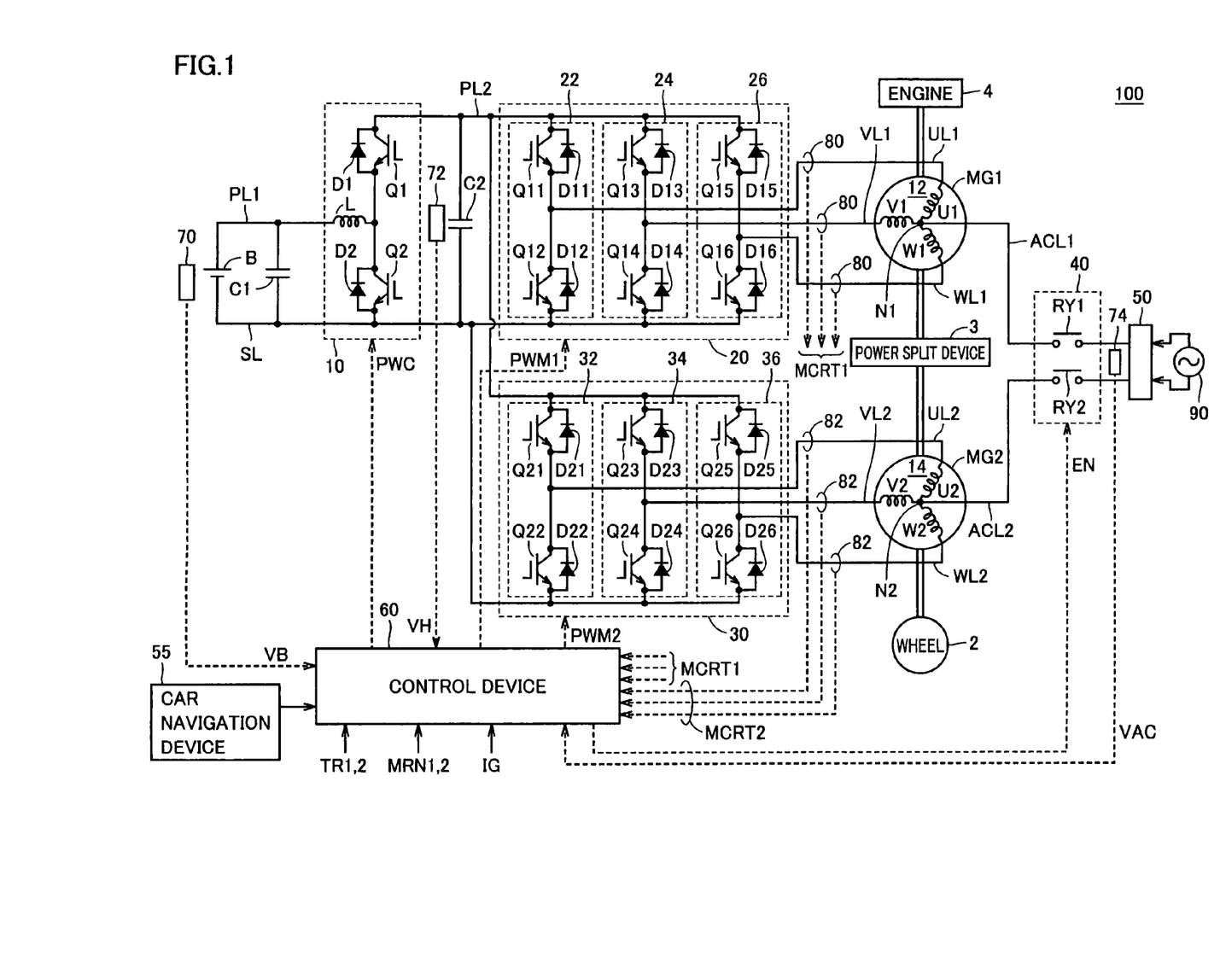
FIG. 1 is a general block diagram of a hybrid vehicle 100 according to an embodiment of the present invention.

FIG. 1 is a general block diagram of a hybrid vehicle 100 according to an embodiment of the present invention.

With reference to FIG. 1, hybrid vehicle 100 includes an engine 4, motor generators MG1, MG2, a power split device 3, and a wheel 2. Furthermore, hybrid vehicle 100 includes an electric power storage device B, a boost converter 10, inverters 20, 30, a control device 60, a car navigation device 55, capacitors C1, C2, power supply lines PL1, PL2, a grounding line SL, U phase lines UL1, UL2, V phase lines VL1, VL2, W phase lines WL1, WL2, voltage sensors 70, 72, and current sensors 80, 82. Furthermore, hybrid vehicle 100 includes electric power input lines ACL1, ACL2, a relay circuit 40, an input terminal 50, and a voltage sensor 74.

Power split device 3 is coupled with engine 4 and motor generators MG1, MG2 to split motive power therebetween. For example, power split device 3 can be a planetary gear mechanism having three shafts of rotation, i.e., a sun gear, a planetary carrier and a ring gear. The three shafts of rotation are connected to those of engine 4 and motor generators MG1, MG2, respectively. For example, motor generator MG1 can have a rotor hollowed to have its center passing a crankshaft of engine 4 therethrough to mechanically connect engine 4 and motor generators MG1, MG2 to power split device 3.

Note that motor generator MG2 has its shaft of rotation coupled with wheel 2 by a reduction gear, a differential gear and/or the like (not shown). Furthermore, power split device 3 may further have a speed reducer incorporated therein for the shaft of rotation of motor generator MG2.

Motor generator MG1 is incorporated in hybrid vehicle 100 as that operating as an electric power generator driven by engine 4 and also an electric motor that can start engine 4, and motor generator MG2 is incorporated in hybrid vehicle 100 as an electric motor driving wheel 2 serving as a drive wheel.

Electric power storage device B has a positive electrode connected to power supply line PL1 and a negative electrode connected to grounding line SL. Capacitor C1 is connected between power supply line PL1 and grounding line SL.

Boost converter 10 includes a reactor L, npn transistors Q1, Q2, and diodes D1, D2. Npn transistors Q1, Q2 are connected between power supply line PL2 and grounding line SL in series. Diode D1 is connected between the collector and emitter of npn transistor Q1 to pass a current from the emitter to the collector, and diode D2 is connected between the collector and emitter of npn transistor Q2 to pass a current from the emitter to the collector. Reactor L has one end connected to a point connecting npn transistors Q1, Q2 together and the other end connected to power supply line PL1.

Note that the above npn transistor and that described in the present specification hereinafter can be implemented for example by an insulated gate bipolar transistor (IGBT), and furthermore, the npn transistor may be replaced with a power metal oxide semiconductor field-effect transistor (power MOSFET) or a similar electric power switching element.

Capacitor C2 is connected between power supply line PL2 and grounding line SL. Inverter 20 includes a U phase arm 22, a V phase arm 24 and a W phase arm 26 connected between power supply line PL2 and grounding line SL in parallel.

U phase arm 22 includes series connected npn transistors Q11, Q12. V phase arm 24 includes series connected npn transistors Q13, Q14. W phase arm 26 includes series connected npn transistors Q15, Q16. Between the npn transistors Q11-Q16 respective collectors and emitters, diodes D11-D16 are connected, respectively, to pass a current from the emitters to the collectors.

Motor generator MG1 includes a 3-phase coil 12 as a stator coil. 3-phase coil 12 is formed of a U phase coil U1, a V phase coil V1 and a W phase coil W1, which have their respective one ends connected together to provide a neutral point N1 and their respective other ends connected to points connecting the npn transistors in U phase arm 22, V phase arm 24 and W phase arm 26, respectively, of inverter 20.

Inverter 30 includes a U phase arm 32, a V phase arm 34 and a W phase arm 36. Motor generator MG2 includes a 3-phase coil 14 as a stator coil. Inverter 30 and motor generator MG2 are similar in configuration to inverter 20 and motor generator MG1, respectively. Accordingly they will not be described repeatedly.

Relay circuit 40 includes relays RY1, RY2. While relay RY1, RY2 can be implemented for example by a mechanical contact relay, relay RY1, RY2 may be a semiconductor relay. Relay RY1 has one end connected to that of electric power input line ACL1 and electric power input line ACL1 has the other end connected to neutral point N1 of 3-phase coil 12 of motor generator MG1. Furthermore, relay RY2 has one end connected to that of electric power input line ACL2 and electric power input line ACL2 has the other end connected to neutral point N2 of 3-phase coil 14 of motor generator MG2. Furthermore, relays RY1, RY2 have their respective other ends connected to input terminal 50.

Electric power storage device B is a chargeable and dischargeable dc power supply and for example includes a nickel metal hydride battery, a lithium ion battery, or a similar secondary battery. Electric power storage device B outputs dc electric power to boost converter 10. Furthermore, electric power storage device B is charged by boost converter 10. Note that electric power storage device B may be a capacitor of large capacity.

Voltage sensor 70 detects voltage VB of electric power storage device B and outputs the detected voltage VB to control device 60. Capacitor C1 smoothes variation in voltage between power supply line PL1 and grounding line SL.

Boost converter 10 operates in response to a signal PWC received from control device 60 to boost through reactor L a dc voltage received from electric power storage device B and output the boosted voltage on power supply line PL2. More specifically, boost converter 10 operates in response to signal PWC received from control device 60 and stores a current that flows as npn transistor Q2 operates to switch in reactor L as magnetic field energy to boost the dc voltage received from electric power storage device B. Boost converter 10 outputs the boosted voltage via diode D1 to power supply line PL2 in synchronization with when npn transistor Q2 is turned off.

Furthermore, boost converter 10 operates in response to signal PWC received from control device 60 to downconvert a dc voltage that is received through power supply line PL2 from one or both of inverters 20, 30 to a level in voltage of electric power storage device B and charge electric power storage device B therewith.

Capacitor C2 smoothes variation in voltage between power supply line PL2 and grounding line SL. Voltage sensor 72 detects voltage of capacitor C2 between its terminals, i.e., voltage VH of power supply line PL2 with respect to grounding line SL, and outputs the detected voltage VH to control device 60.

Inverter 20 operates in response to a signal PWM1 received from control device 60 to convert dc voltage that is received from power supply line PL2 to 3-phase ac voltage, and output the 3-phase ac voltage to motor generator MG1. Thus, motor generator MG1 is driven to generate a designated torque. Furthermore, inverter 20 operates in response to signal PWM1 received from control device 60 to convert 3-phase ac voltage that is generated by motor generator MG1 receiving an output of engine 4 to dc voltage, and output the dc voltage to power supply line PL2.

Inverter 30 operates in response to a signal PWM2 received from control device 60 to convert dc voltage that is received from power supply line PL2 to 3-phase ac voltage, and output the 3-phase ac voltage to motor generator MG2. Thus, motor generator MG2 is driven to generate a designated torque. Furthermore, when the vehicle is regeneratively braked, inverter 30 operates in response to signal PWM2 received from control device 60 to convert 3-phase ac voltage that is generated by motor generator MG2 receiving a torque from wheel 2 to dc voltage, and output the dc voltage to power supply line PL2.

Note that regenerative braking as referred to herein includes: braking accompanied by electric power regeneration when the driver of the vehicle operates the foot brake; not operating the foot brake, while releasing the accelerator pedal while the vehicle is traveling, to reduce vehicular speed (or stop acceleration) while providing regenerative electric power regeneration; and the like.

Furthermore, when electric power storage device B is charged from a commercial power supply 90 external to the vehicle and connected to input terminal 50, inverters 20, 30 convert ac electric power that is provided from commercial power supply 90 through electric power input lines ACL1, ACL2 to 3-phase coil 12, 14 at neutral points N1, N2 to dc electric power and output the dc electric power to power supply line PL2.

Motor generator MG1, MG2 is a 3-phase ac electric motor and can for example be a 3-phase ac synchronous electric motor. Motor generator MG1 uses an output of engine 4 to generate 3-phase ac voltage and outputs the generated 3-phase ac voltage to inverter 20. Furthermore, motor generator MG1 generates driving force by 3-phase ac voltage received from inverter 20 to start engine 4. Motor generator MG2 generates the vehicle's driving torque by 3-phase ac voltage received from inverter 30. Furthermore, when the vehicle is regeneratively braked, motor generator MG2 generates and outputs 3-phase ac voltage to inverter 30.

Relay circuit 40 electrically connects input terminal 50 to electric power input lines ACL1, ACL2 when an input enable signal EN received from control device 60 is activated. More specifically, when input enable signal EN is activated, relay circuit 40 turns on relays RY1, RY2, and when input enable signal EN is inactivated, relay circuit 40 turns off relays RY1, RY2.

Input terminal 50 connects commercial power supply 90 external to hybrid vehicle 100 to the vehicle, and in hybrid vehicle 100 a method described hereinafter can be employed to charge electric power storage device B from commercial power supply 90 external to the vehicle and connected to input terminal 50.

Car navigation device 55 detects the current position of hybrid vehicle 100 and displays it on a display unit (not shown). Furthermore, car navigation device 55 calculates a distance to be traveled from the current position of hybrid vehicle 100 to a charging location allowing electric power storage device B to be charged by commercial power supply 90, and outputs to control device 60 the calculated distance to be traveled. Note that the charging location allowing electric power storage device B to be charged from commercial power supply 90 is set for example at home as the vehicle having come home would have the electric power storage device sufficiently charged. Car navigation device 55 may be adapted to allow a driver to set a charging location.

Note that the vehicle's current position can be detected by a global positioning system (GPS) utilizing an artificial satellite to measure the vehicle's position, a beacon installed on a road, and other similar well known techniques.

Current sensor 80 detects a motor current MCRT1 flowing through motor generator MG1 and outputs the detected motor current MCRT1 to control device 60. Current sensor 82 detects a motor current MCRT2 flowing through motor generator MG2 and outputs the detected motor current MCRT2 to control device 60. Voltage sensor 74 detects voltage VAC of commercial power supply 90 connected to input terminal 50 and outputs the detected voltage VAC to control device 60.

Control device 60 generates signal PWC for driving boost converter 10 and signals PWM1, PWM2 for driving inverters 20, 30, respectively, and outputs the generated signals PWC, PWM1, PWM2 to boost converter 10 and inverters 20, 30, respectively.

Herein if an ignition key (or an ignition switch) issues a signal IG indicating an off position, and ac electric power is received from commercial power supply 90 by input terminal 50, control device 60 activates input enable signal EN output to relay circuit 40, and control device 60 generates signals PWM1, PWM2 for controlling inverters 20, 30 to allow the ac electric power provided from commercial power supply 90 through electric power input lines ACL1, ACL2 to neutral points N1, N2 to be converted to dc electric power and thus output to power supply line PL2.

Furthermore, control device 60 controls the SOC of electric power storage device B to fall between predetermined upper and lower control limits. It is represented by values of 0-100% with its fully charged state represented by 100%. More specifically, when electric power storage device B has an SOC lower than the lower limit control value, control device 60 starts engine 4 to cause motor generator MG1 to generate electric power to charge electric power storage device B. Furthermore, when electric power storage device B has an SOC exceeding the upper limit control value, control device 60 stops engine 4 to stop motor generator MG1 from generating electric power.

Herein, control device 60 receives from car navigation device 55 a distance to be traveled from the current position of hybrid vehicle 100 to a charging location allowing electric power storage device B to be charged by commercial power supply 90, and sets upper and lower limit control values for the SOC of electric power storage device B in accordance with the received distance to be traveled.

Figure 2:
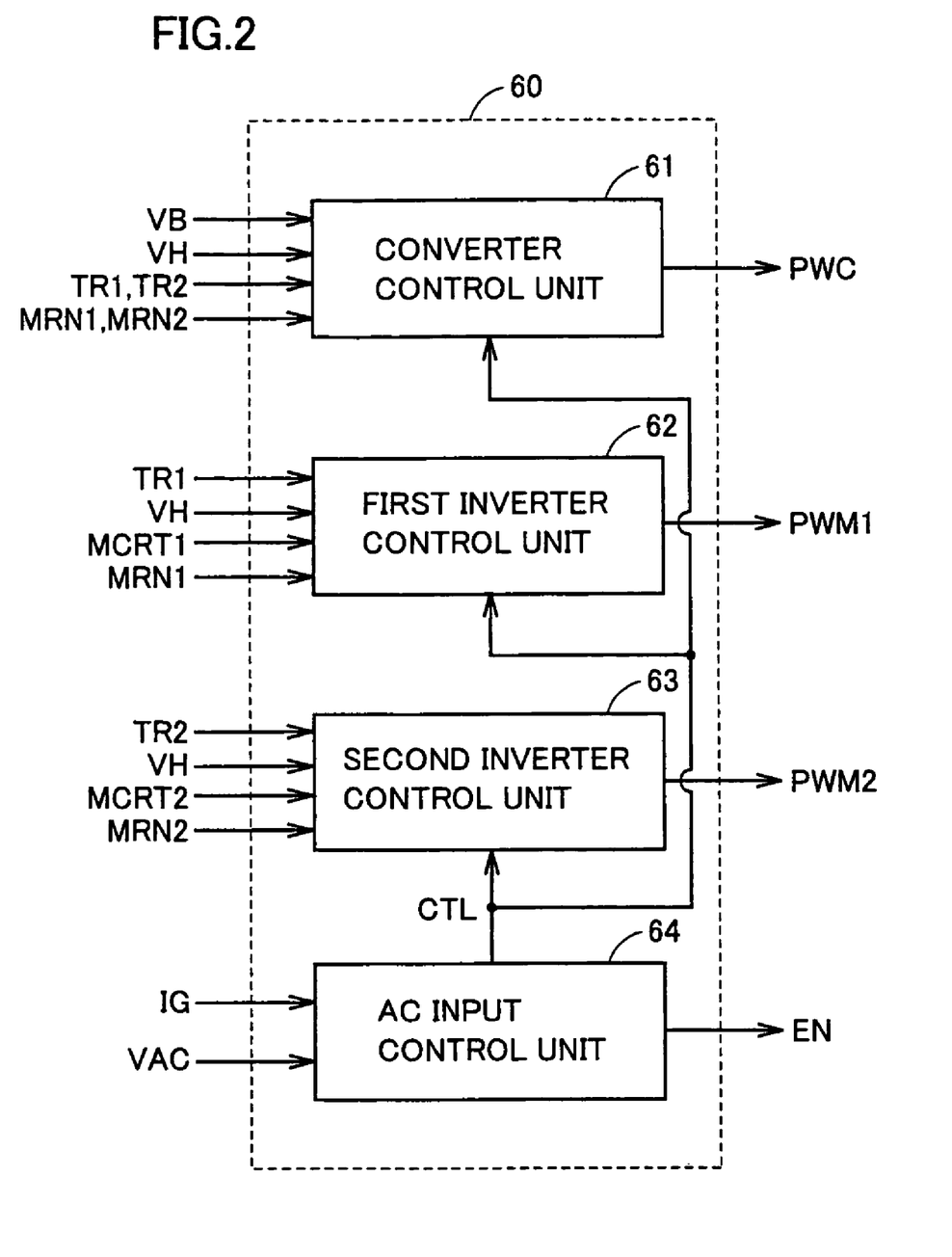
FIG. 2 is a functional block diagram of a control device 60 shown in FIG. 1.

FIG. 2 is a functional block diagram of control device 60 shown in FIG. 1. Note that control device 60 can be implemented by any of software and hardware.

With reference to FIG. 2, control device 60 includes a converter control unit 61, a first inverter control unit 62, a second inverter control unit 63, and an AC input control unit 64.

Converter control unit 61 generates signal PWC, as based on voltage VB received from voltage sensor 70, voltage VH received from voltage sensor 72, torque command values TR1, TR2 output from an electronic control unit (ECU) (not shown) for motor generators MG1, MG2, motor speeds MRN1, MRN2, and a control signal CTL received from AC input control unit 64, for turning on/off npn transistors Q1, Q2 of boost converter 10 and outputs the generated signal PWC to boost converter 10.

First inverter control unit 62 generates signal PWM1, as based on torque command value TR1 for and motor speed MRN1 of motor generator MG1, voltage VH, motor current MCRT1 received from current sensor 80, and control signal CTL, for turning on/off npn transistors Q11-Q16 of inverter 20, and outputs the generated signal PWM1 to inverter 20.

Second inverter control unit 63 generates signal PWM2, as based on torque command value TR2 for and motor speed MRN2 of motor generator MG2, voltage VH, motor current MCRT2 received from current sensor 82, and control signal CTL, for turning on/off npn transistors Q21-Q26 of inverter 30, and outputs the generated signal PWM2 to inverter 30.

AC input control unit 64 determines from signal IG received from the ECU and voltage VAC received from voltage sensor 74 whether to charge electric power storage device B from commercial power supply 90 external to the vehicle. If AC input control unit 64 determines to charge, AC input control unit 64 activates control signal CTL output to converter control unit 61 and first and second inverter control units 62, 63 and activates input enable signal EN output to relay circuit 40.

Figure 3:
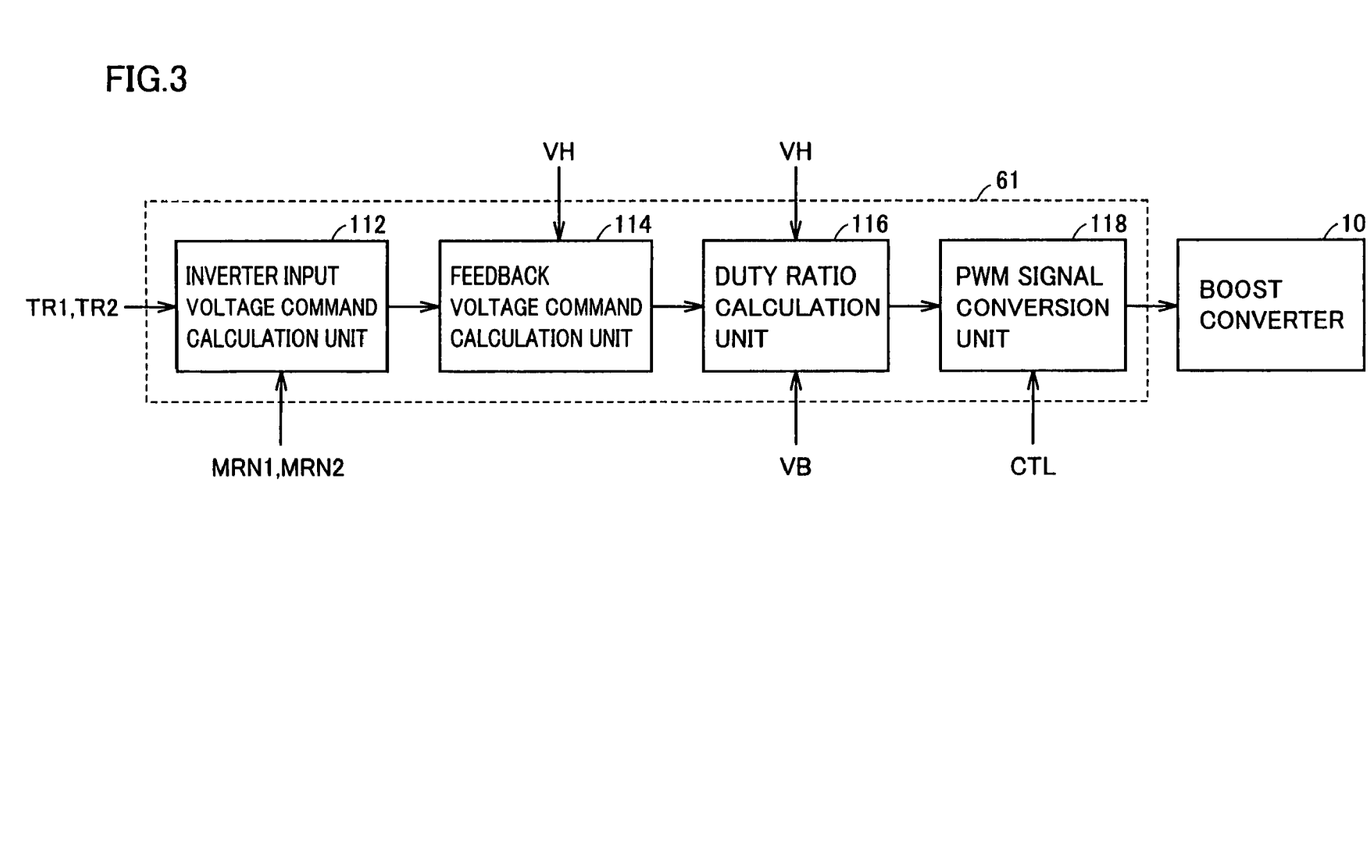
FIG. 3 is a functional block diagram of a converter control unit 61 shown in FIG. 2.

FIG. 3 is a functional block diagram of converter control unit 61 shown in FIG. 2.

With reference to FIG. 3, converter control unit 61 includes an inverter input voltage command calculation unit 112, a feedback voltage command calculation unit 114, a duty ratio calculation unit 116, and a PWM signal conversion unit 118.

Inverter input voltage command calculation unit 112 calculates an optimal value of (or a target value for) voltage input to the inverters, i.e., a voltage command VH_com, as based on torque command values TR1, TR2 and motor speeds MRN1, MRN2, and outputs the calculated voltage command VH_com to feedback voltage command calculation unit 114.

With reference to FIGS. 1 and 3, feedback voltage command calculation unit 114 calculates a feedback voltage command VH_com_fb, as based on voltage VH output from boost converter 10, as detected by voltage sensor 72, and voltage command VH_com received from inverter input voltage command calculation unit 112, for controlling output voltage VH in accordance with voltage command VH_com, and outputs the calculated feedback voltage command VH_com_fb to duty ratio calculation unit 116.

Duty ratio calculation unit 116 calculates a duty ratio, as based on voltage VB received from voltage sensor 70 and feedback voltage command VH_com_fb received from feedback voltage command calculation unit 114, for controlling voltage VH output from boost converter 10 in accordance with voltage command VH_com, and outputs the calculated duty ratio to PWM signal conversion unit 118.

PWM signal conversion unit 118 receives the duty ratio from duty ratio calculation unit 116 and generates a pulse width modulation (PWM) signal, as based on the received duty ratio, for turning on/off npn transistors Q1, Q2 of boost converter 10, and outputs the generated PWM signal as signal PWC to npn transistors Q1, Q2 of boost converter 10.

Note that increasing a duty cycle for which npn transistor Q2 of a lower arm of boost converter 10 turns on increases electric power stored in reactor L, and a higher voltage output can be obtained. In contrast, increasing a duty cycle for which npn transistor Q1 of an upper arm of boost converter 10 turns on decreases the voltage of power supply line PL2. Accordingly, by controlling the duty ratio of npn transistors Q1, Q2, the voltage of power supply line PL2 can be controlled to be any voltage of at least that output from electric power storage device B.

Furthermore, when control signal CTL is active, PWM signal conversion unit 118 brings npn transistor Q1 and npn transistor Q2 into and out of conduction, respectively, regardless of the output of duty ratio calculation unit 116. Thus a charging current can be passed from power supply line PL2 to power supply line PL1.

Figure 4:
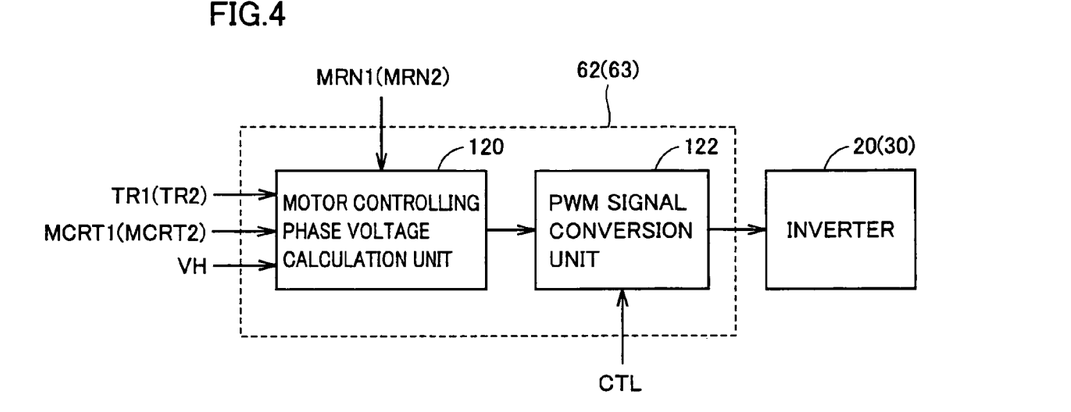
FIG. 4 is a functional block diagram of first and second inverter control units 62, 63 shown in FIG. 2.

FIG. 4 is a functional block diagram of first and second inverter control units 62, 63 shown in FIG. 2.

With reference to FIGS. 1 and 4, first and second inverter control units 62, 63 each include a motor controlling phase voltage calculation unit 120 and a PWM signal conversion unit 122.

Motor controlling phase voltage calculation unit 120 calculates voltage applied to each phase coil of motor generator MG1 (or MG2), as based on torque command value TR1 (or TR2) and motor speed MRN1 (or MRN2) received from the ECU, motor current MCRT1 (or MCRT2) received from current sensor 80 (or 82), and voltage VH received from voltage sensor 72, and outputs to PWM signal conversion unit 122 the calculated voltage applied to each phase coil.

PWM signal conversion unit 122 receives a voltage command for each phase coil from motor controlling phase voltage calculation unit 120 and in response thereto generates a signal PWM1_0 (a type of signal PWM1) (or PWM2_0 (a type of signal PWM2)) actually turning on/off npn transistors Q11-Q16 (or Q21-Q26) of inverter 20 (or 30) and outputs the generated signal PWM1_0 (or PWM2_0) to npn transistors Q11-Q16 (or Q21-Q26) of inverter 20 (or 30).

Thus npn transistors Q11-Q16 (or Q21-Q26) are controlled to be switched to control a current passed to each phase of motor generator MG1 (or MG2) to cause motor generator MG1 (or MG2) to output a torque as commanded. As a result a motor outputs torque in accordance with torque command value TR1 (or TR2).

Furthermore, when AC input control unit 64 outputs active control signal CTL, PWM signal conversion unit 122 generates a signal PWM1_1 (a type of signal PWM1) (or PWM2_1 (a type of signal PWM2)) turning on/off npn transistors Q11-Q16 (or Q21-Q26) to pass ac currents in phase to the inverter 20 (or 30) U phase arm 22 (or 32), V phase arm 24 (or 34) and W phase arm 26 (or 36), regardless of the output of motor controlling phase voltage calculation unit 120, and outputs the generated signal PWM1_1 (or PWM2_1) to the inverter 20 (or 30) npn transistors Q11-Q16 (or Q21-Q26).

Note that if the U, V, W phase coil U1, V1, W1 (or U2, V2, W2) pass ac currents in phase, motor generator MG1 (or MG2) does not generate rotary torque, and, as will be described hereinafter, inverters 20 and 30 are controlled to cooperate to allow ac voltage VAC provided from commercial power supply 90 to neutral points N1, N2 to be converted to dc voltage and thus supplied to power supply line PL2.

Figure 5:
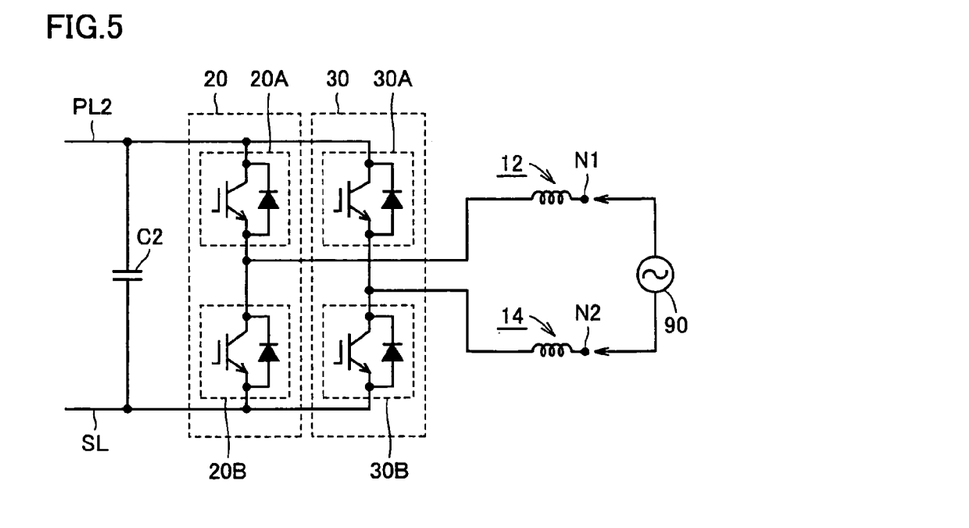
FIG. 5 is a circuit diagram showing a zero phase equivalent circuit of inverters 20, and motor generators MG1, MG2 shown in FIG. 1.

FIG. 5 is a circuit diagram showing a zero phase equivalent circuit of inverters 20, and motor generators MG1, MG2 shown in FIG. 1.

With reference to FIG. 5, in each inverter 20, 30, which is a 3-phase inverter, the six npn transistors have their on/off combinations in eight patterns. Of the eight switching patterns, two patterns allow an interphase voltage to be zero, and such a state of voltage is referred to as a zero voltage vector. For the zero voltage vector, the upper arms' three transistors can be regarded as being switched in mutually the same state (i.e., all on or off), and the lower arms' three transistors can also be regarded as being switched in mutually the same state.

Accordingly in FIG. 5 inverter 20 has npn transistors Q11, Q13, Q15 represented as an upper arm 20A collectively and npn transistors Q12, Q14, Q16 represented as a lower arm 20B collectively. Similarly, inverter 30 has npn transistors Q21, Q23, Q25 represented as an upper arm 30A collectively and npn transistors Q22, Q24, Q26 represented as a lower arm 30B collectively.

As shown in FIG. 5, the zero phase equivalent circuit can be regarded as a single-phase PWM converter having as an input thereof single-phase commercial power supply 90 electrically connected to neutral points N1, N2 via relay circuit 40 and input terminal 50 shown in FIG. 1. Accordingly, varying a zero voltage vector in each of inverters 20, and controlling inverters 20, 30 to switch them to each operate as a phase arm of a single-phase PWM converter allow single-phase ac electric power received from commercial power supply 90 to be converted to dc electric power and supplied to power supply line PL2.

Control device 60 thus described with reference to FIG. 2 to FIG. 4 can also be implemented by software using a computer.

Figure 6:
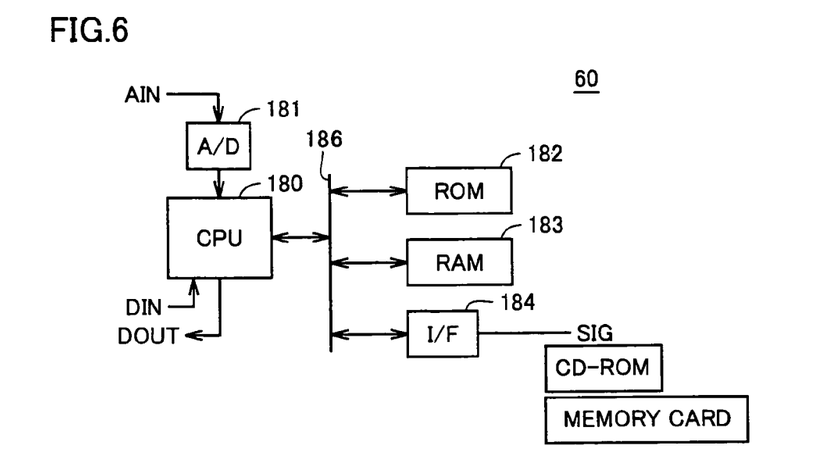
FIG. 6 shows a general configuration provided when control device 60 is implemented as a computer.

FIG. 6 shows a general configuration provided when control device 60 is implemented as a computer.

With reference to FIG. 6, control device 60 implemented by a computer includes a CPU 180, an A/D converter 181, a ROM 182, a RAM 183, and an interface unit 184.

A/D converter 181 receives an analog signal AIN output from a variety of types of sensors or the like, converts the signal to a digital signal, and outputs the digital signal to CPU 180. Furthermore, CPU 180 is connected to ROM 182, RAM 183 and interface unit 184 by a data bus, an address bus or a similar bus 186 to communicate data.

ROM 182 has stored therein data such as a program executed by CPU 180, a map referenced, and the like. RAM 183 is a working area used for example when CPU 180 processes data, and temporarily stores a variety of types of variables.

Interface unit 184 for example: communicates with another ECU; inputs data for rewrite when ROM 182 is an electrically rewriteable flash memory or the like; reads a data signal SIG from a memory card, a CD-ROM, or a similar computer readable storage medium; and the like.

Note that CPU 180 communicates a data input signal DIN and a data output signal DOUT through an input/output port.

Furthermore, control device 60 is not limited to such a configuration as above: it may be implemented to include a plurality of CPUs.

[Control in Charging]

Figure 7:
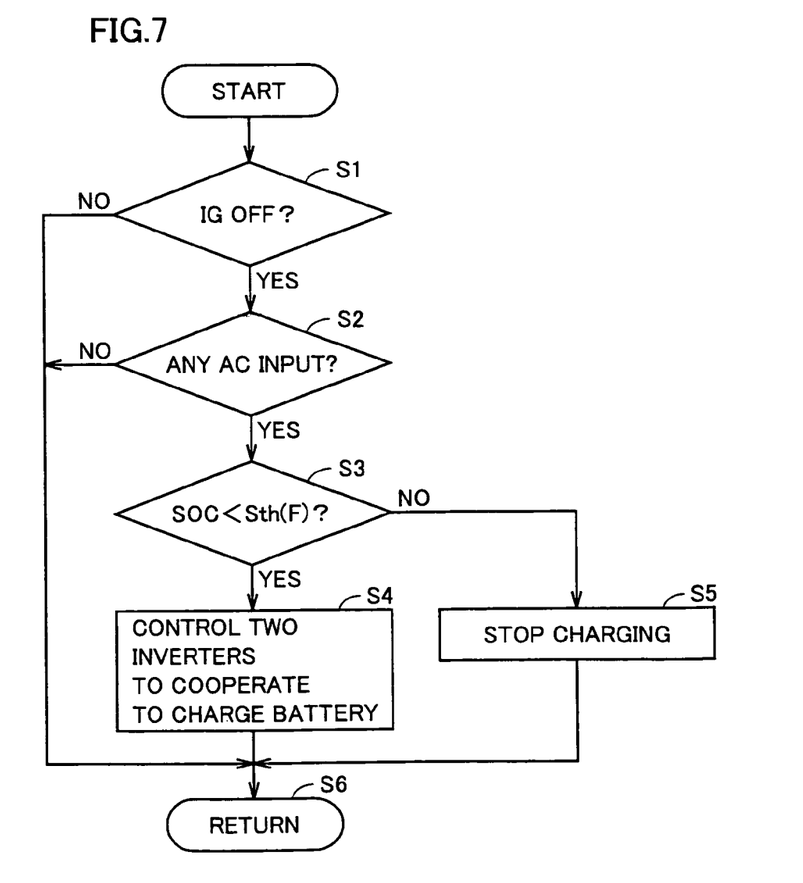
FIG. 7 is a flowchart representing a structure of a program for control in connection with a decision made by the FIG. 1 control device 60 to start charging.

FIG. 7 is a flowchart representing a structure of a program for control in connection with a decision made by the FIG. 1 control device 60 to start charging. Note that this flowchart represents a process invoked from a main routine and executed for each fixed period of time or whenever a predetermined condition is established.

With reference to FIG. 7, control device 60 determines from signal IG received from the ignition key whether the ignition key is set at the off position (step S1). If control device 60 determines that the ignition key is not set at the off position (NO at step S1), control device 60 determines that it is inappropriate to connect commercial power supply 90 to input terminal 50 to charge electric power storage device B, and control device 60 proceeds to step S6 to return to the main routine.

If in step S1 control device 60 determines that the ignition key is set at the off position (YES at step S1), control device 60 determines from voltage VAC received from voltage sensor 74 whether ac electric power received from commercial power supply 90 is currently input to input terminal 50 (step S2). If voltage VAC is not observed, control device 60 determines that ac electric power is not input to input terminal 50 (NO at step S2), and control device 60 proceeds to step S6 to return to the main routine.

In contrast, if voltage VAC is detected, control device 60 determines that ac electric power received from commercial power supply 90 is currently input to input terminal 50 (YES at step S2). Then, control device 60 determines whether electric power storage device B has an SOC below a threshold value Sth(F) (step S3). Note that threshold value Sth(F) is a value used to determine whether electric power storage device B has a sufficient SOC.

If control device 60 determines that electric power storage device B has an SOC below threshold value Sth(F) (YES at step S3), control device 60 activates input enable signal EN output to relay circuit 40, and control device 60 causes each phase arm to operate to switch in the same state in each of the two inverters 20, 30 while controlling the switching of the two inverters 20, 30 each regarded as a phase arm of a single-phase PWM converter to charge electric power storage device B (step S4). Thereafter control device 60 proceeds to step S6 to return to the main routine.

In contrast, if in step S3 control device 60 determines that electric power storage device B has an SOC of at least threshold value Sth(F) (NO at step S3), control device 60 determines that it is not necessary to charge electric power storage device B, and control device 60 performs a process to stop charging (step S5). More specifically, control device 60 stops inverters 20, 30 and inactivates input enable signal EN output to relay circuit 40. Thereafter control device 60 proceeds to step S6 to return to the main routine.

[Control in Traveling]

Hereinafter, management of a state of charge or SOC when the hybrid vehicle according to the present embodiment travels will be described.

With reference again to FIG. 1, the hybrid vehicle according to the present embodiment in one aspect includes engine 4, motor generator MG2 used to drive wheel 2, chargeable and dischargeable electric power storage device B supplying motor generator MG2 with electric power, motor generator MG1 receiving mechanical motive power from engine 4 to generate electric power, electric power input unit (input terminal 50) receiving electric power provided from external to the vehicle to charge electric power storage device B, and control device 60 controlling an amount charged from motor generator MG1 to electric power storage device B to allow electric power storage device B to have an amount of a state, representing a state of charge (SOC), approaching a target control value. Control device 60 inquires of an occupant of the vehicle whether the occupant has an intention to go to a charging location, and control device 60 changes the target control value in accordance with an instruction of the occupant.

Preferably, the charging location is previously set, and when the vehicle's current position has a distance of at most a predetermined value to the charging location, control device 60 inquires whether the occupant has an intention to go to the charging location.

More specifically, control device 60 has a special SOC control mode available when the vehicle's current position has the distance of at most the predetermined value to the charging location, and control device 60 inquires of the occupant whether to select the unique SOC control mode when a decision is made in a navigation system that the distance to the charging location is at most the predetermined value.

Preferably, the charging location is at home as set previously.

Preferably, if the occupant provides an instruction indicating that the occupant has an intention to go to the charging location, control device 60 sets the target control value to be lower than when the occupant does not have an intention to go to the charging location.

Preferably, control device 60 further inquires of the occupant an amount to be charged, and changes the target control value in accordance with the amount to be charged.

Figure 8:
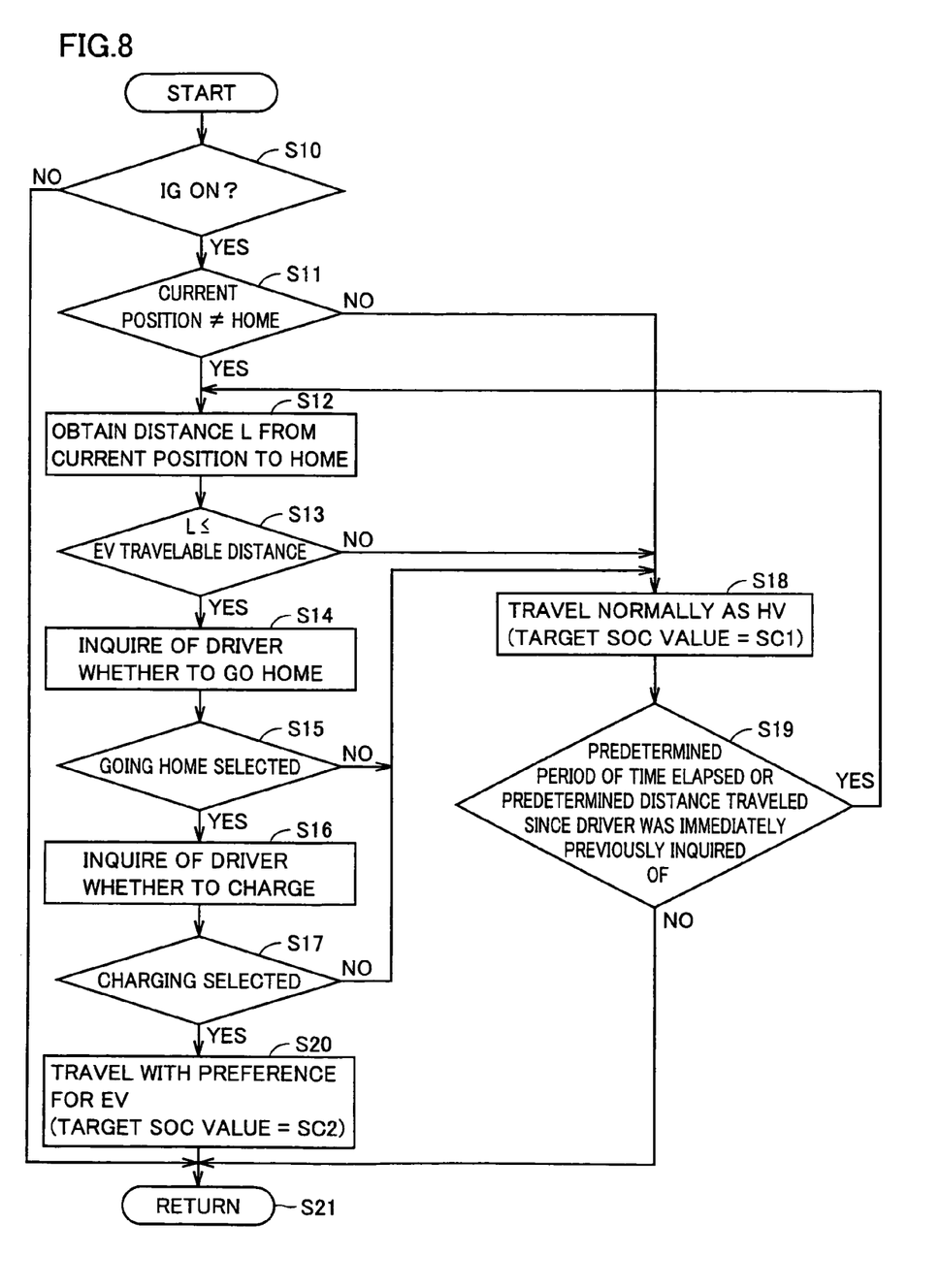
FIG. 8 is a flowchart representing a flow of controlling for management of a state of charge (SOC) when the hybrid vehicle travels.

FIG. 8 is a flowchart representing a flow of controlling for management of a state of charge or SOC when the hybrid vehicle travels. Note that this flowchart represents a process invoked from a main routine and executed for each fixed period of time or whenever a predetermined condition is established.

With reference to FIG. 1 and FIG. 8, control device 60 determines from signal IG received from the ignition key whether the ignition key is set at an on position (step S10).

If control device 60 determines that the ignition key is not set at the on position (NO at step S1), control device 60 proceeds to step S21 to return to the main routine. If control device 60 determines that the ignition key is turned on, control device 60 proceeds to step S11, and control device 60 obtains the location of the home and the vehicle's current position from car navigation device 55 and determines whether the vehicle's current position is not at home. If not, the control proceeds to step S12. If the vehicle's current position is at home, it is considered that the vehicle has just been charged at home, and accordingly, the control proceeds to step S18.

In step S12, control device 60 obtains from car navigation device 55 a distance L extending from the current position to the home, and in step S13 compares the obtained distance L with an EV travelable distance. The EV travelable distance is a distance that can be traveled without using engine 4 with the current state of charge of electric power storage device B. Accordingly, if distance L≦the EV travelable distance is not established, and the vehicle travels as an EV and electric power storage device B is reduced in SOC, then in the end before the vehicle arrives home the engine must be started to travel normally as an HV. In other words, if distance L≦the EV travelable distance is not established, it is inevitable that the vehicle travels normally as an HV.

It is known that in causing a vehicle to travel as an HV with the engine operated, an SOC extremely close to a lower limit value prevents the vehicle from traveling as an HV efficiently. Accordingly, if it is inevitable to cause the vehicle to travel normally as an HV, it is preferable to avoid decreasing the SOC of electric power storage device B to be close to the lower limit value.

Accordingly if in step S13 distance L≦the EV travelable distance is not established the control proceeds to step S18 to cause the vehicle to travel normally as an HV with a target SOC value of SC1.

In contrast if in step S13 distance L≦the EV travelable distance is established, the control proceeds to step S14. In step S14, control device 60 inquires of the driver whether to go home. This inquiry is done audibly or by an indication displayed on a car navigation display.

Subsequently in step S15 control device 60 awaits a result of the inquiry from the driver or an occupant seated in a passenger seat. The result of the inquiry is input through a button provided for example on a touch panel of the car navigation display to be pressed; audio recognition; and/or the like. If in step S15 the result of the inquiry selects "go home" the control proceeds to step S16 and if the result of the inquiry does not select "go home" the control proceeds to step S18.

In step S16 the occupant is further inquired of whether to charge. This is because the vehicle that has come home may have to immediately leave home and in that case it is not preferable to reduce the SOC of electric power storage device B to be extremely low.

Step S16 is followed by step S17, in which control device 60 waits for the driver or the occupant in the passenger seat to input a result of the inquiry. If in step S17 the result of the inquiry selects "charge" the control proceeds to step S20 and if the result of the inquiry does not select "charge" the control proceeds to step S18.

Note that steps S14-S17 may be one collective inquiry such as "go home and charge?".

In step S20 a traveling mode with preference for EV is determined to be the current traveling mode. For the traveling mode with preference for EV, a target SOC value SC2 is set for electric power storage device B. Target SOC value SC2 is set to be lower than target SOC value SC1 applied when the vehicle travels normally as an HV. After step S20 the control proceeds to step S21 and shifts to the main routine.

If NO in step S13 or step S17, then in step S18 a normal HV traveling mode is determined to be the current traveling mode. In the normal HV traveling mode the target SOC value of SC1 is set. Subsequently, the control proceeds to step S19.

In step S19, a decision is made on whether a predetermined period of time has elapsed or a predetermined distance has been traveled since the control immediately previously inquired of the driver. More specifically, if the control has just inquired, the result of the inquiry of whether to go home and charge would not change, and accordingly, the control will not inquire again. If NO in step S19, the control proceeds to step S21 to shift to the main routine.

If a period of time has elapsed since the immediately previous inquiry or the vehicle has moved significantly, however, the result of the inquiry may change. Accordingly, if YES in step S19, step S12 and the following steps are again performed.

Figure 9:
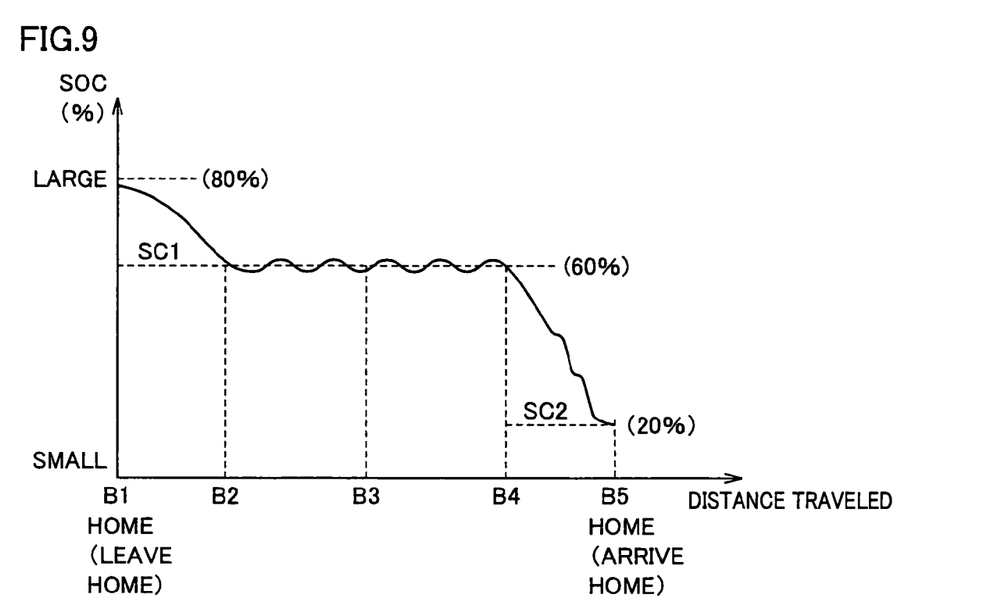
FIG. 9 shows a relationship between a distance that the vehicle having left home travels before it comes home and its SOC.

FIG. 9 shows a relationship between a distance that the vehicle having left home travels before it comes home and its SOC.

With reference to FIG. 9, if a destination is for example a geographical point B3, then B1-B3 is an outward route and B3-B5 is a homeward route.

When the vehicle leaves home (or at geographical point B1), electric power storage device B has been charged at home and thus has an SOC close to an upper limit management value (for example in a vicinity of 80%). At this time point is provided a target SOC management value of SC1 slightly lower than the upper limit value, and accordingly between geographical points B1-B2 unless the vehicle is rapidly accelerated the vehicle travels as an EV with the engine stopped and consumes the energy of electric power storage device B. Consequently at geographical point B1 electric power storage device B has an SOC decreased to target value SC1.

SOC is slightly decreased immediately after the vehicle leaves because such allows electric power storage device B to recover electric power generated by motor generator MG2 in regenerative braking. This allows the vehicle to travel efficiently in terms of energy.

Between geographical points B2-B4 the engine is operated and by the engine's torque motor generator MG1 generates electric power, and most of the generated electric power is used by motor generator MG2. Electric power storage device B is charged with an excess of the generated electric power and discharges for shortage thereof repeatedly. As a result, electric power storage device B has an SOC held in a vicinity of target value SC1 (e.g., 60%).

At geographical point B4 the vehicle has a distance to the home within a predetermined distance. The vehicular control device inquires of the occupant, and if the result of the inquiry indicates going home and charging, the current traveling mode is changed to the traveling mode with preference for EV decreasing a target SOC value to SC2.

The distance from geographical point B4 to geographical point B5 is a distance of an extent that the vehicle that travels simply as an EV starting in a condition with an SOC at SC1 can travel to come home. Accordingly, EV traveling with the engine stopped is performed: Note that if the driver desires significantly large acceleration or the like, the engine is started and SOC has a portion leveled off, and at geographical point B5 electric power storage device B has an SOC substantially close to a lower limit management value (e.g., 20%). As such, when the vehicle arrives home, electric power storage device B has a state allowing a large amount of electric power to be received thereby.

As much energy as possible can thus be received at a charging location. A vehicle can thus be obtained that less depends on an internal combustion engine and emits less exhaust gas and thus contributes to environmental protection.

With reference again to FIG. 1 and FIG. 8, the present invention in the present embodiment will be summarized.

The present invention in one aspect provides a method of controlling a hybrid vehicle including engine 4, motor generator MG2 used to drive wheel 2, chargeable and dischargeable electric power storage device B supplying motor generator MG2 with electric power, motor generator MG1 receiving mechanical motive power from engine 4 to generate electric power, and electric power input unit (terminal 50) receiving electric power provided from external to the vehicle to charge electric power storage device B. The method of controlling the hybrid vehicle includes: step S14 of inquiring of an occupant of the vehicle whether the occupant has an intention to go to a charging location; step S18 of controlling first charging, controlling an amount charged from motor generator MG1 to electric power storage device B to allow electric power storage device B to have an amount of a state, representing a state of charge (SOC), approaching a first target control value (SC1); step S20 of controlling second charging, controlling an amount charged from motor generator MG1 to electric power storage device B to allow the amount of the state to approach a second target control value (SC2) lower than the first target control value (SC1); and step S15 of determining in accordance with an instruction of the occupant to perform one of the step of controlling the first charging and the step of controlling the second charging.

Preferably, the charging location is previously set. The method further includes: step S12 of obtaining a distance L extending from the vehicle's current position to the charging location; and step S13 of determining whether distance L is at most a predetermined value. Step S14 of inquiring includes inquiring whether the occupant has an intention to go to the charging location when the distance is at most the predetermined value.

Preferably, the charging location is at home as set previously.

Preferably, step S15 of determining to perform one of the step of controlling the first charging and the step of controlling the second charging causes step S20 of controlling the second charging to be performed if the occupant's instruction indicates that the occupant has an intention to go to the charging location, and step S15 causes step S18 of controlling the first charging to be performed if the occupant's instruction indicates that the occupant does not have an intention to go to the charging location.

Preferably, the method further includes: step S16 of further inquiring of the occupant an amount to be charged; and step S17 of causing step S20 of controlling the second charging to be performed if the occupant's instruction indicates that charging is to be done, and causing step S18 of controlling the first charging to be performed if the occupant's instruction indicates that charging is not to be done.

[Exemplary Variation]

Figure 10:
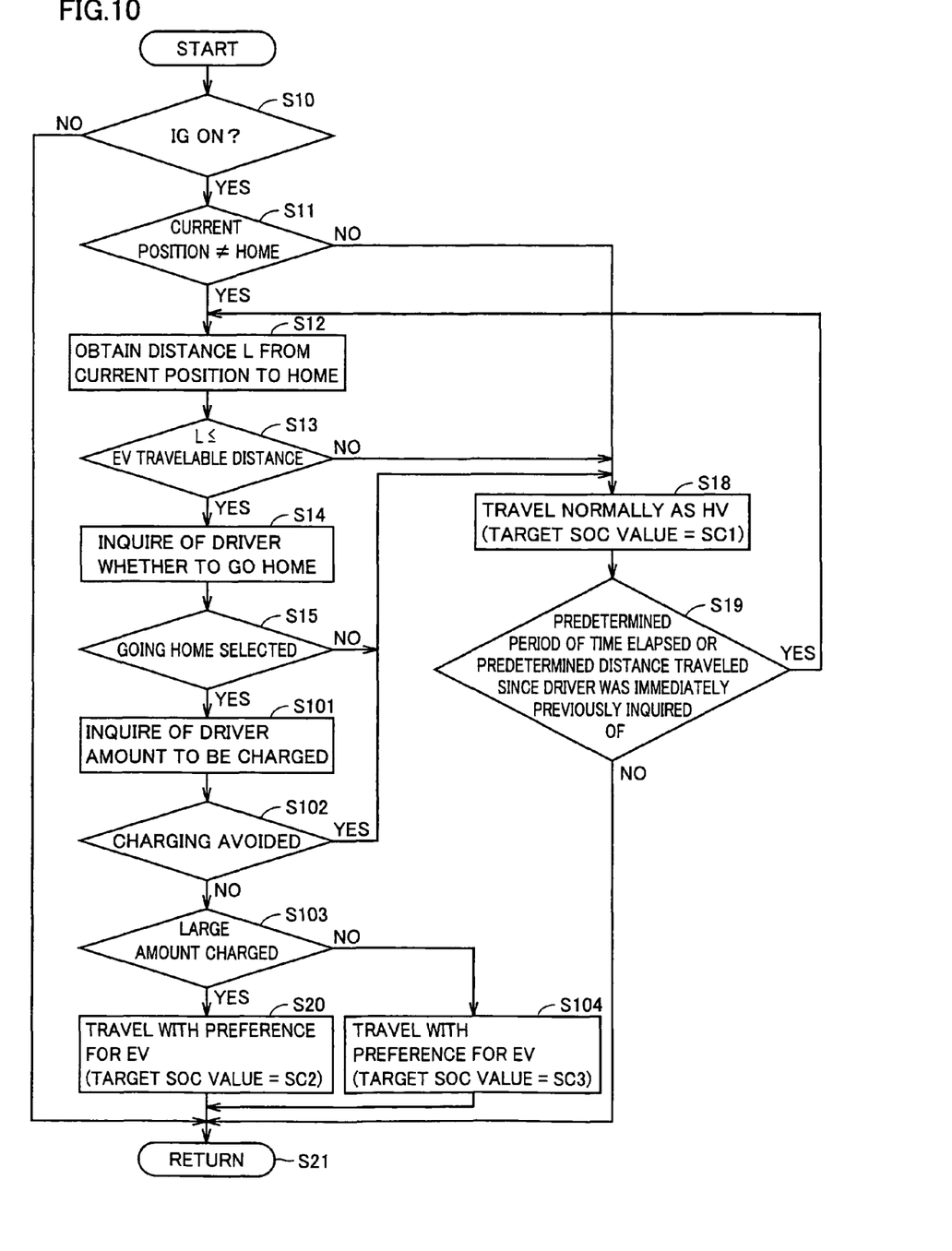
FIG. 10 is a flowchart representing an exemplary variation of controlling described with reference to FIG. 8.

FIG. 10 is a flowchart representing an exemplary variation of controlling described with reference to FIG. 8.

The FIG. 10 flowchart corresponds to the FIG. 8 flowchart having steps S16, S17 replaced with steps S101-S104. The remainder has been described with reference to the FIG. 8 flowchart. Accordingly it will not be described repeatedly.

With reference to FIG. 10, if in step S15 there is an input of "go home", then in step S101 control device 60 inquires of the occupant an amount to be charged. The inquiry is done for example by causing a car navigation display to indicate "How long charged? A: 2 hours, B: 1 hour, C: 30 minutes" or the like to urge the occupant to select A, B or C.

Then in steps S1102, S103 a directing is determined in accordance with a period of time that the occupant has selected to charge therefor.

In step S102 a decision is made on whether charging is substantially not performed. For example, selecting "C: 30 minutes" also leads to a decision that charging is not performed. If YES at step S102, the control proceeds to step S18 to set the normal HV traveling mode to be the current traveling mode.

If NO at step S102 then in step S103 a decision is made on whether a large amount is charged. If so (for example if "A: 2 hours" is selected), the control proceeds to step S20 and the traveling mode with preference for EV with a target SOC set at SC2 is selected. If a large amount is not charged (for example if "B: 1 hour" is selected), the control proceeds to step S104 and the traveling mode with preference for EV with a target SOC set at SC3 is selected.

Note herein that a target SOC value has a relationship of SC1>SC3>SC2. When step S20 or step S104 ends, then in step S21 the control is shifted to the main routine.

Figure 11:
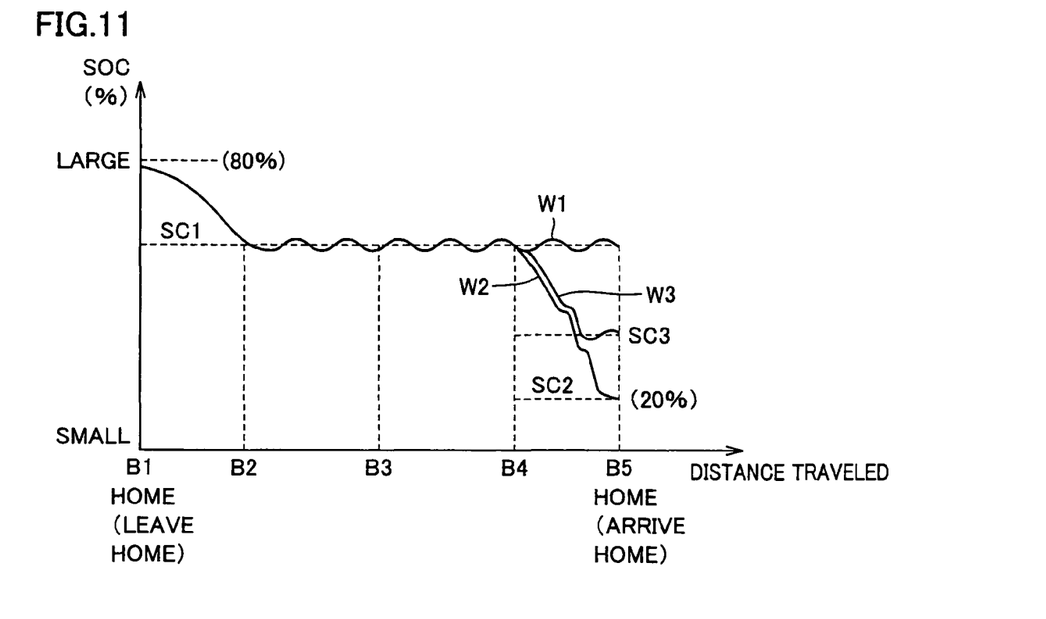
FIG. 11 shows one example of how SOC varies when the vehicle is controlled in accordance with the FIG. 10 flowchart.

FIG. 11 shows one example of how SOC varies when the vehicle is controlled in accordance with the FIG. 10 flowchart.

FIG. 11 is identical to FIG. 9 for geographical points B1-B4. Accordingly it will not be described repeatedly. In FIG. 11 at geographical point B4 the vehicle has a distance to the home within a predetermined distance. The vehicular control device inquires of an occupant of the vehicle, and if the result of the inquiry indicates going home and charging, a target SOC value is set at any of SC1, SC2 and SC3 in accordance with an amount to be charged.

If a small or no amount is charged, the target SOC is the same as that for geographical points B1-B4, i.e., set at SC1. In that case, as indicated by a waveform W1, when the vehicle has arrived home, electric power storage device B allows an amount to be charged thereto that corresponds to an upper limit SOC management value (e.g., 80%) minus SC1 (e.g., 60%) (i.e., for example 20%).

If a moderate amount is charged then the target SOC is set at SC3. In that case, as indicated by a waveform W3, when the vehicle has arrived home, electric power storage device B allows an amount to be charged thereto that corresponds to the upper limit SOC management value (e.g., 80%) minus SC3 (e.g., 40%) (i.e., for example 40%).

If a large amount is charged then the target SOC is set at SC2. In that case, as indicated by a waveform W2, when the vehicle has arrived home, electric power storage device B allows an amount to be charged thereto that corresponds to the upper limit SOC management value (e.g., 80%) minus SC3 (e.g., 20%) (i.e., for example 60%).

Thus the exemplary variation provides a method of controlling a hybrid vehicle, that further includes step S101 of further inquiring of an occupant of the vehicle an amount to be charged and step S103 of changing a second target control value in accordance with the amount to be charged.

Thus as much energy as possible can be received at a charging location. A vehicle can thus be obtained that less depends on an internal combustion engine and emits less exhaust gas and thus contributes to environmental protection.

Furthermore, the exemplary variation allows a battery to have a state set to have an SOC decreased to match a charging time when the vehicle arrives home. Thus when a period of time for which charging is to be done elapses and the vehicle again leaves home, it can have an SOC charged-close to an upper limit management value, and hence also an EV travelable distance of approximately the same extent when the vehicle leaves home next time.

Note that in FIG. 1 car navigation device 55 is included and a distance between the location of a home or a similar charging location and a vehicle's current position is obtained from car navigation device 55. However, it is not limited thereto. For example, car navigation device 55 may be replaced with a simpler GPS device mounted to obtain the distance between the location of the home or a similar charging location and the vehicle's current position.

Furthermore, the method disclosed in the above embodiment can be implemented in software using a computer. A program for causing a computer to perform the method may be read into a computer internal to a vehicular control device from a storage medium (ROM, CD-ROM, a memory card or the like) having the program stored therein readably by the computer or may be provided through a communication line.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A hybrid vehicle comprising:
   an internal combustion engine;
   an electric motor used to drive a wheel;
   a chargeable and dischargeable electric power storage device supplying said electric motor with electric power;

an electric power generation device receiving mechanical motive power from said internal combustion engine to generate electric power;

an electric power input unit receiving electric power provided from external to the vehicle to charge said electric power storage device; and a control device controlling an amount charged from said electric power generation device to said electric power storage device to allow said electric power storage device to have an amount of a state, representing a state of charge of said electric power storage device, approaching a target control value, wherein said control device inquires of an occupant of the vehicle whether the occupant has an intention to go to a previously set charging location when the vehicle's current position has a distance of at most a predetermined value to said charging location, and said control device changes said target control value in accordance with an instruction of the occupant.

2. The hybrid vehicle according to claim 1, wherein said control device has a control mode setting said target control value to be lower than a normal value available when the vehicle's current position has said distance of at most said predetermined value to said charging location.

3. The hybrid vehicle according to claim 2, wherein said control device further inquires of the occupant an amount to be charged, and changes said target control value in accordance with said amount to be charged.

4. The hybrid vehicle according to claim 1, wherein if the occupant provides an instruction indicating that the occupant has an intention to go to said charging location, said control device sets said target control value to be lower than when the occupant does not have an intention to go to said charging location.

5. The hybrid vehicle according to claim 4, wherein said control device further inquires of the occupant an amount to be charged, and changes said target control value in accordance with said amount to be charged.

6. The hybrid vehicle according to claim 1, wherein said control device further inquires of the occupant an amount to be charged, and changes said target control value in accordance with said amount to be charged.

7. A method of controlling with a control device a hybrid vehicle including an internal combustion engine, an electric motor used to drive a wheel, a chargeable and dischargeable electric power storage device supplying said electric motor with electric power, an electric power generation device receiving mechanical motive power from said internal combustion engine to generate electric power, and an electric power input unit receiving electric power provided from external to the vehicle to charge said electric power storage device, the method of using the control device comprising the steps of:

inquiring of an occupant of the vehicle whether the occupant has an intention to go to a charging location, said charging location being previously set;

controlling first charging, controlling an amount charged from said electric power generation device to said electric power storage device to allow said electric power storage device to have an amount of a state, representing a state of charge of said electric power storage device, approaching a first target control value;

controlling second charging, controlling the amount charged from said electric power generation device to said electric power storage device to allow said amount of said state to approach a second target control value lower than said first target control value;

determining in accordance with an instruction of the occupant to perform one of the step of controlling said first charging and the step of controlling said second charging;

obtaining a distance extending from the vehicle's current position to said charging location; and determining whether said distance is at most a predetermined value, wherein the step of inquiring inquires whether the occupant has an intention to go to said charging location when said distance is at most said predetermined value.

8. The method of controlling a hybrid vehicle according to claim 7, wherein the step of determining to perform one of the step of controlling said first charging and the step of controlling said second charging causes the step of controlling said second charging to be performed if the occupant's instruction indicates that the occupant has an intention to go to said charging location, and the step of determining causes the step of controlling said first charging to be performed if the occupant's instruction indicates that the occupant does not have an intention to go to said charging location.

9. The method of controlling a hybrid vehicle according to claim 8, further comprising the steps of:

further inquiring of the occupant an amount to be charged; and changing said second target control value in accordance with said amount to be charged.

10. The method of controlling a hybrid vehicle according to claim 7, further comprising the steps of:

further inquiring of the occupant an amount to be charged; and changing said second target control value in accordance with said amount to be charged.

11. A computer readable storage medium having a program stored therein for causing a computer to perform the method of controlling a hybrid vehicle according to claim 10.

12. A computer readable storage medium having a program stored therein for causing a computer to perform the method of controlling a hybrid vehicle according to claim 7.

13. A computer readable storage medium having a program stored therein for causing a computer to perform the method of controlling a hybrid vehicle according to claim 8.

* * * * *